United States Patent [19]
Li

[11] Patent Number: 5,392,488
[45] Date of Patent: Feb. 28, 1995

[54] ROTATABLE WINDSHIELD WIPER HAVING A DUAL BLADE ASSEMBLY

[76] Inventor: Chiu-Chieh Li, No. 108, Jen Ai Rd., Lu Chou Hsiang, Taipei Hsien,

[21] Appl. No.: 164,748
[22] Filed: Dec. 10, 1993
[51] Int. Cl.⁶ .......................... B60S 1/28; B60S 1/40
[52] U.S. Cl. ........................ 15/250.41; 15/250.33; 15/250.42; 15/250.19
[58] Field of Search ......... 15/250.40, 250.41, 250.42, 15/250.33, 250.23, 250.36, 250.19, 245, 250.09

[56] References Cited

U.S. PATENT DOCUMENTS

| | | | |
|---|---|---|---|
| 1,853,715 | 4/1932 | Anderson | 15/250.40 |
| 2,149,037 | 2/1939 | Zaiger | 15/250.41 |
| 2,160,736 | 5/1939 | Horton | 15/250.40 |
| 5,243,731 | 9/1993 | Yang | 15/250.33 |
| 5,257,436 | 11/1993 | Yang | 15/250.41 |

FOREIGN PATENT DOCUMENTS 138048 10/1981 Japan ................... 15/250.36

Primary Examiner—David A. Scherbel
Assistant Examiner—Gary K. Graham
Attorney, Agent, or Firm—Jacobson, Price, Holman & Stern

[57] ABSTRACT

A windshield wiper for automobiles, comprising a mechanical arm, a holder fixed with the mechanical arm and holding a blade clamp, which then separably connects with a blade with two wiping portions to contact the surface of a windshield for wiping the surface of the windshield when the mechanical arm is swung right and left, and the clamp being possible to rotate relative to the holder.

8 Claims, 3 Drawing Sheets

5,392,488

ROTATABLE WINDSHIELD WIPER HAVING A DUAL BLADE ASSEMBLY

BACKGROUND OF THE INVENTION

A common conventional windshield wiper comprises a blade made of rubber clamped by a mechanical arm, which swings right and left to wipe rain fallen on the surface of a windshield. When the mechanical arm swings to the left, the end of the blade may point to the right, and on the contrary, when the mechanical arm swings to the right, the end of the blade may point to the left. Rotation of the blade is mainly caused by elasticity of the material of the blade. So the blade will break, tear owing to alteration of the material of the blade.

SUMMARY OF THE INVENTION

This invention has been devised to offer an improved windshield wiper having a better structure so as to permit the blade usable for a long period of time. The present invention has a mechanical arm detachably connected with a holder, which is also separably connected with a blade clamp by means of a cylindrical groove in the holder engaging a lengthwise tubular portion in an upper region of the blade clamp. A blade is also separably combined with the blade clamp, having two wiping portions to contact the surface of a windshield for wiping rain off the surface of the windshield. The clamp is possible to turn relative to the holder to give the blade better elasticity in wiping.

DETAILED DESCRIPTION OF THE INVENTION

Figure 1:
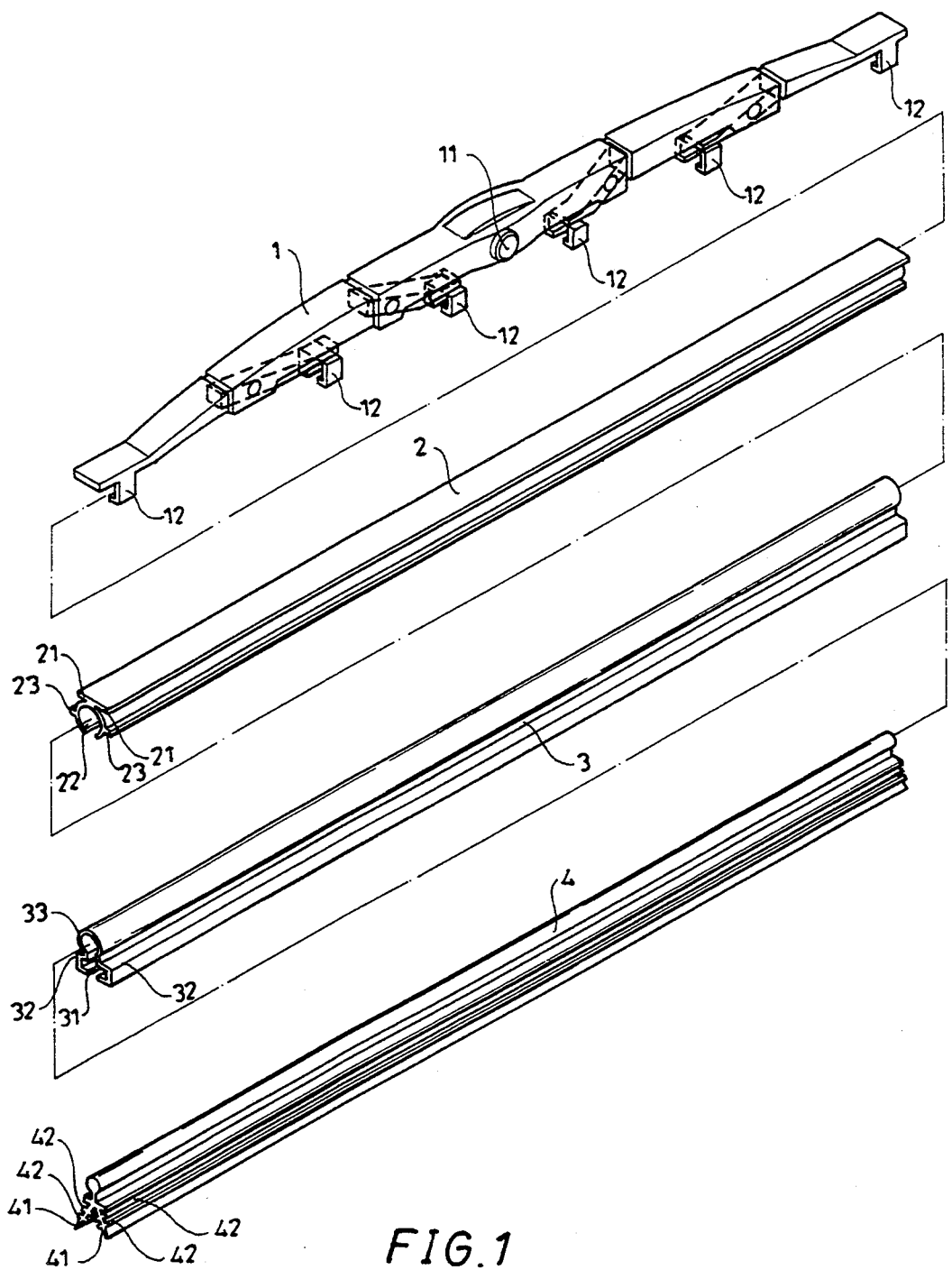
FIG. 1 is an exploded perspective view of a windshield wiper in the present invention.

A windshield wiper in the present invention, as shown in FIG. 1, comprises a mechanical arm 1, an elongate holder 2, an elongate blade clamp 3, an elongate blade 4 combined together.

The mechanical arm 1 has a structure as that of a common conventional mechanical arm, having a combining hole 11 in an intermediate portion for combining a power source to move the arm 1, and a plurality of locating seats 12 extending down from a bottom of the arm 1 each of the locating seats having a T-shaped groove for receiving the elongate holder 2.

The elongate holder 2 is combined with the mechanical arm 1 and the blade 4, having a commensurately shaped upper portion 21 to fit into the T-shaped groove of the locating seats 12 of the mechanical arm 1, a lengthwise cylindrical groove 22 below the commensurate shaped upper portion, 21 with a down opening for the blade clamp 3 or the blade 4 to fit and being able to turn therein, and two horizontal arms 23 each arm outwardly extending from a lower portion of the holder at each side of the lengthwise cylindrical groove 22 to stop the blade clamp 3 or the blade 4 when the clamp 3 or the blade 4 turns.

The elongate blade clamp 3 has a lengthwise tubular portion 33 to fit in the lengthwise cylindrical groove 22 of the elongate holder 2 to combine the holder and the clamp both 2, 3 together. The blade clamp 3 also has two shoulders, 32 extending at each side of the blade clamp 3 located below the lengthwise tubular portion 33. The shoulders 32 define a second T-shaped groove 31 which is continuous with the lengthwise tubular portion 33 together providing a wiper blade receiving means. Each of the shoulders 32 may contact with either of the two horizontal arms 23 when the clamp 3 turns relative to the holder 2.

Figure 4:
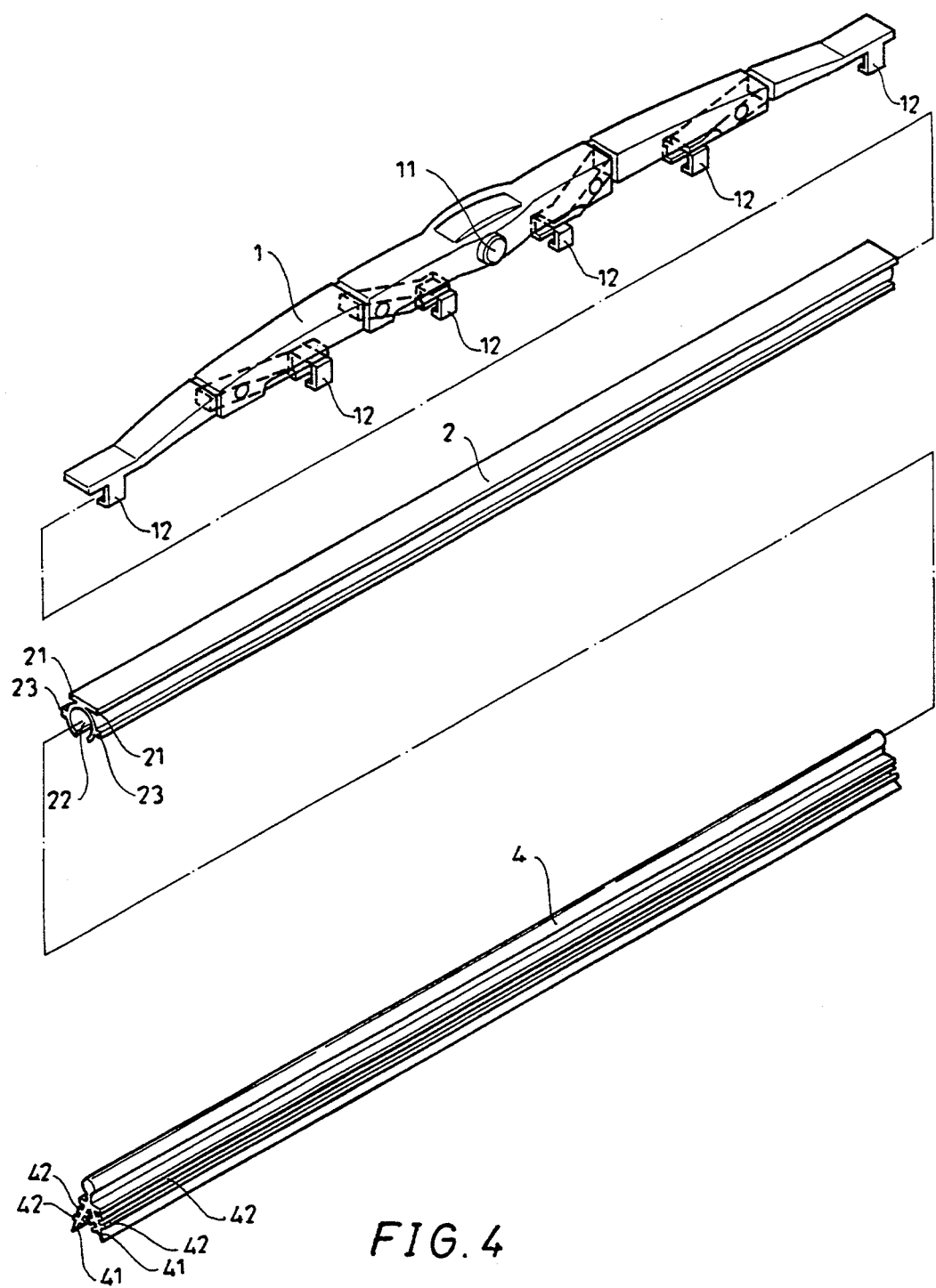
FIG. 4 is an exploded perspective view of another embodiment of the windshield wiper in the present invention.

The elongate blade 4 has an upper engaging means of commensurate shape and size as the wiper blade receiving means of said blade clamp 3 to engage therein. The upper engaging means has, at least, an upper cylindrical portion to engage with the lengthwise tubular portion 33 of the wiper blade receiving means and preferably located below said upper cylindrical portion of said blade 4 are two horizontal arms for engaging with said second T-shaped groove 31 to keep the blade 4 separably connected with the blade clamp 3 or alternatively directly connected with the holder 2 (as seen in FIG. 4) to turn relative to the holder 2. The blade 4 also has two wiping portions 41, located below said engaging means and extending downward. Each wiping portion 41 is provided with two transverse arms forming ribs 42.

Figure 3:
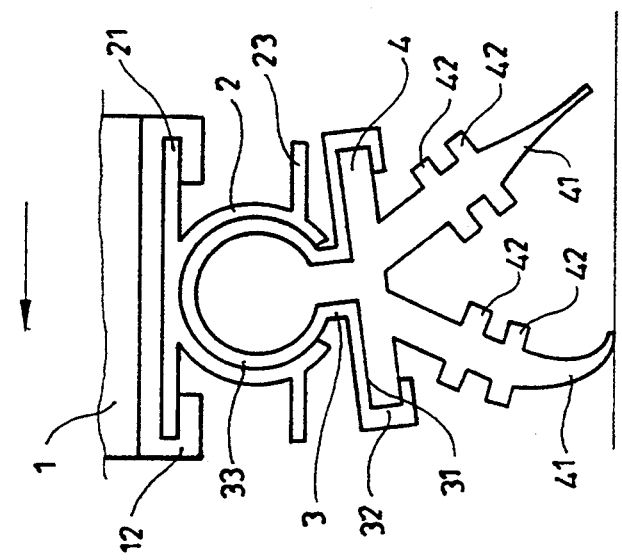
FIG. 3 is a side view of the wiper blade in wiping the surface of a windshield in the present invention.
Figure 2:
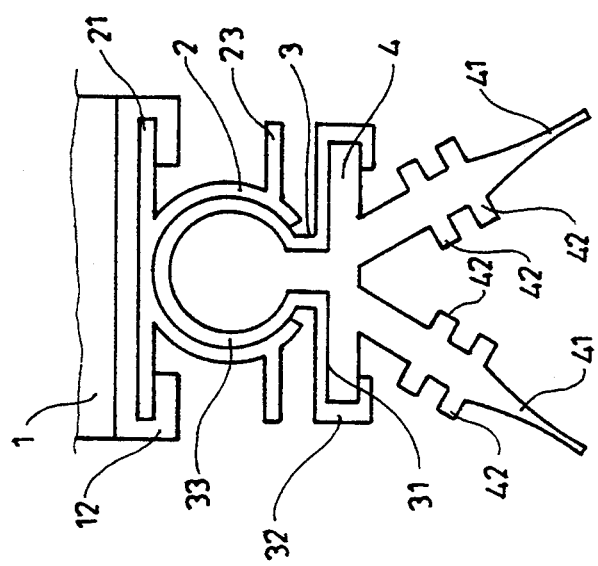
FIG. 2 is a side view of the windshield wiper in the present invention.

FIG. 2 shows a side cross-sectional view of the windshield wiper in the present invention, wherein the blade clamp 3 engages with the lengthwise cylindrical groove 22 of the holder 2, and the commensurately shaped upper portion 21 of the holder 2 engages with the T-shaped grooves of the locating seats 12 of the mechanical arm 1. When the mechanical arm 1 swings to one side, the blade 4 turns relative to the holder 2 via the blade clamp 3 and one of the wiping portions 41 of the blade 4 makes contact with the surface of the windshield and wipes rain away, as shown in FIG. 3.

Another embodiment of the windshield wiper in the present invention is shown in FIG. 4, comprising only a mechanical arm 1, a holder 2 and a blade 4. The blade 4 has a rather large upper cylindrical portion to directly fit in the lengthwise cylindrical groove 22 of the holder 2. Then the blade 4 turns directly relative to the holder 2, functioning quite the same as the above-mentioned embodiment.

What is claimed is:

1. A windshield wiper for automobiles comprising:

an elongate arm having a plurality of locating seats, each seat provided with a T-shaped groove receiving an elongate holder;

the elongate holder having a commensurately shaped upper portion which fits into the T-shaped groove of the locating seats and a lengthwise cylindrical groove located below said upper portion engaging with an elongate blade clamp;

the elongate blade clamp having a lengthwise tubular portion rotatably engaging in said lengthwise cylindrical groove of said elongate holder and two shoulders extending horizontally from said tubular portion at each side of the elongate blade clamp defining a second T-shaped groove below said lengthwise tubular portion such that said second T-shaped groove and said lengthwise tubular portion together provide a wiper blade receiving means; and an elongate wiper blade having an upper cylindrical portion which at least fits into said wiper blade receiving means and two wiping portions extending down from the upper cylindrical portion to contact the surface of a windshield.

2. The windshield wiper according to claim 1, wherein said blade fits in the blade clamp, which then fits in the lengthwise cylindrical groove of said holder, such that in use the blade clamp together with the blade rotates relative to said lengthwise cylindrical groove of said holder.

3. The windshield wiper according to claim 1, wherein said holder further comprises two horizontal arms, each arm outwardly extending at each side of the lengthwise cylindrical groove.

4. The windshield wiper according to claim 3, wherein at least one of the horizontal arms of the holder engages with at least one of the shoulders of said blade clamp, in use.

5. The windshield wiper according to claim 1, wherein the elongate wiper blade further comprises two horizontal arms located below said upper cylindrical portion, which, together with said upper cylindrical portion fits into the wiper blade receiving means of the elongate blade clamp.

6. The windshield wiper according to claim 5, wherein said two horizontal arms engage with said second T-shaped groove of said elongate blade clamp.

7. The windshield wiper according to claim 1, wherein the upper cylindrical portion of the wiper blade engages with the lengthwise tubular portion of said blade clamp.

8. The windshield wiper according to claim 1, wherein said wiping portions of said elongate blade further comprise two transverse arms forming ribs on each of the wiping portions.

* * * * *